(12) United States Patent
Goldstein et al.

(10) Patent No.: US 8,990,341 B2
(45) Date of Patent: Mar. 24, 2015

(54) SYSTEM FOR TRACKING DIFFUSION

(75) Inventors: Daniel Gray Goldstein, New York, NY (US); Sharad Goel, New York, NY (US); Duncan James Watts, New York, NY (US)

(73) Assignee: Yahoo! Inc., Sunnyvale, CA (US)

( * ) Notice: Subject to any disclaimer, the term of this patent is extended or adjusted under 35 U.S.C. 154(b) by 512 days.

(21) Appl. No.: 13/408,510

(22) Filed: Feb. 29, 2012

(65) Prior Publication Data

US 2013/0227057 A1 Aug. 29, 2013

(51) Int. Cl.
*G06F 15/16* (2006.01)
*H04L 12/18* (2006.01)
*H04L 29/12* (2006.01)

(52) U.S. Cl.
CPC ........ *H04L 12/1831* (2013.01); *H04L 61/6072* (2013.01)
USPC ............................ 709/217; 370/310; 370/390

(58) Field of Classification Search
CPC ............ H04L 12/1831; H04L 61/6072; H04L 61/103; G06F 17/30887
USPC ................................... 709/217; 370/310, 390
See application file for complete search history.

(56) References Cited

U.S. PATENT DOCUMENTS

| 8,098,662 B2 * | 1/2012 | Prakash et al. | 370/392 |
| 2008/0008111 A1 * | 1/2008 | Prakash et al. | 370/310 |
| 2012/0170579 A1 * | 7/2012 | Yim et al. | 370/390 |

OTHER PUBLICATIONS

Goel et al., "The Structure of Online Diffusion Networks," EC '12, Jun. 4-8, 2012, Valencia, Spain, 16 pp.
Goldstein, Daniel, "Goodness is Catching This Winter," Internet Article, http://ycorpblog.com/2010/12/10/goodness-catching/, posted Dec. 10, 2010, printed Dec. 13, 2011, 2 pp.

* cited by examiner

*Primary Examiner* — Arvin Eskandarnia
(74) *Attorney, Agent, or Firm* — Brinks Gilson & Lione

(57) ABSTRACT

A computer-implemented method tracks diffusion. The method includes receiving a tracking request from an initiating user to track diffusion of content located at a content address. A computer tracking system generates a first shortened content address for the content address, from which the content is provided to the initiating user. The method includes receiving content requests from one or more requesting users, and generating, for each requesting user, a unique subsequent shortened content address for the content address. Content is provided to each requesting user using the subsequent shortened content address generated for each requesting user respectively. Each content request from the requesting users is made using either the first shortened content address or one of the subsequent shortened content addresses.

6 Claims, 13 Drawing Sheets

```
mysql> select * from urls limit 5;
+----+----------------------------+----------------------+---------------------+-------------+
| id | url                        | user_id              | ts                  | ip          |
+----+----------------------------+----------------------+---------------------+-------------+
|  1 | http://yahoo.com           | ADaoCYHc72yVUq94     | 2011-12-13 13:43:10 | 10.74.24.23 |
|  2 | http://cnn.com             | ADaoCYHc72yVUq94     | 2011-12-13 13:48:15 | 10.74.24.23 |
|  3 | http://sixdeg.net/test.html| ADaoCYHc72yVUq94     | 2011-12-13 14:03:52 | 10.74.24.23 |
|  4 | http://yahoo.com           | ADaoCYHc72yVUq94     | 2011-12-13 14:18:02 | 10.74.24.23 |
|  5 | http://yahoo.com           | ADaoCYHc72yVUq94     | 2011-12-14 15:46:48 | 10.74.24.15 |
+----+----------------------------+----------------------+---------------------+-------------+
5 rows in set (0.00 sec)
```

```
mysql> select * from links limit 5;
+--------+--------+------------------------+--------+---------------------+--------------+
| id     | parent | user_id                | url_id | ts                  | ip           |
+--------+--------+------------------------+--------+---------------------+--------------+
| O3EzemO| 8PfMz  | rWIp9TOTQDCNwGjK       |      1 | 2011-12-12 18:48:54 | 10.74.24.23  |
| O8PfMz | JcXPlv | JttRAgdFAsUCOODF       |      1 | 2011-12-12 18:48:03 | 10.74.24.23  |
| OrCbYw | NULL   | ADaoCYHc72yVUq94       |      4 | 2011-12-12 19:03:52 | 10.74.24.23  |
| 3F2pbO |        | ADaoCYHc72yVUq94       |     18 | 2011-12-13 11:18:02 | 10.74.24.15  |
| 3mwXfq |        | ADaoCYHc72yVUq94       |     22 | 2011-12-24 14:46:48 | 10.74.24.6   |
+--------+--------+------------------------+--------+---------------------+--------------+
```

SYSTEM FOR TRACKING DIFFUSION

TECHNICAL FIELD

The present description relates generally to a system and method, generally referred to as a system, for tracking diffusion. More specifically, the present description relates to a system for tracking diffusion of content shared on or over a network.

BACKGROUND

The evolution and development of electronic technology and data transfer systems allow users to interact with each other faster and more often than ever before. Extraordinary amounts of information and data are constantly being sent and received over various networks. Often users may post or send information or data of interest to other users whenever and as often as the user chooses.

SUMMARY

A computer-implemented method tracks diffusion. The method includes receiving a tracking request from an initiating user to track diffusion of content located at a content address. A computer tracking system generates a first shortened content address for the content address, from which the content is provided to the initiating user. The method includes receiving content requests from one or more requesting users, and generating, for each requesting user, a unique subsequent shortened content address for the content address. Content is provided to each requesting user using the subsequent shortened content address generated for each requesting user respectively. Each content request from the requesting users is made using either the first shortened content address or one of the subsequent shortened content addresses.

Other systems, methods, features and advantages will be, or will become, apparent to one with skill in the art upon examination of the following figures and detailed description. It is intended that all such additional systems, methods, features and advantages be included within this description, be within the scope of the embodiments, and be protected by the following claims and be defined by the following claims. Further aspects and advantages are discussed below in conjunction with the description.

BRIEF DESCRIPTION OF THE DRAWINGS

The system and/or method may be better understood with reference to the following drawings and description. Non-limiting and non-exhaustive descriptions are described with reference to the following drawings. The components in the figures are not necessarily to scale, emphasis instead being placed upon illustrating principles. In the figures, like referenced numerals may refer to like parts throughout the different figures unless otherwise specified.

FIG. 4 is an example of a database of information stored by a tracking system.

FIG. 9 is an example of a database used by a tracking system to track diffusion of content.

DETAILED DESCRIPTION

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Communications technologies allow consumers, businesses, and other organizations (generally "users") to exchange information, data, and ideas rapidly using a wide variety of devices and networks. Users may transmit, receive, or otherwise share information and data through or using a variety of electronic media, networks, and formats.

As one example, a user may view content presented by or through an electronic source (such as a webpage provided by a content provider) which the user finds interesting or informative. The user may share the content from the electronic source (such as the webpage) with friends or other users, such as by posting, sending, or otherwise sharing with other users an identifier for the electronic source (such as a content address like a unique resource locator (URL) address or other address of a webpage). For example, the user may copy the identifier or content address (such as a URL address) and post the identifier or content address to a message board or social networking site, or email or text the identifier to one or more friends or other users. Recipient users may interact with the identifier or content address (such as by clicking on the URL address or otherwise pasting a URL address into an address bar of a web browser) and access the content from the electronic source. The recipient users may, in turn, share this content with still other users in the same, similar, or various other ways. Other examples are possible.

Figure 1:
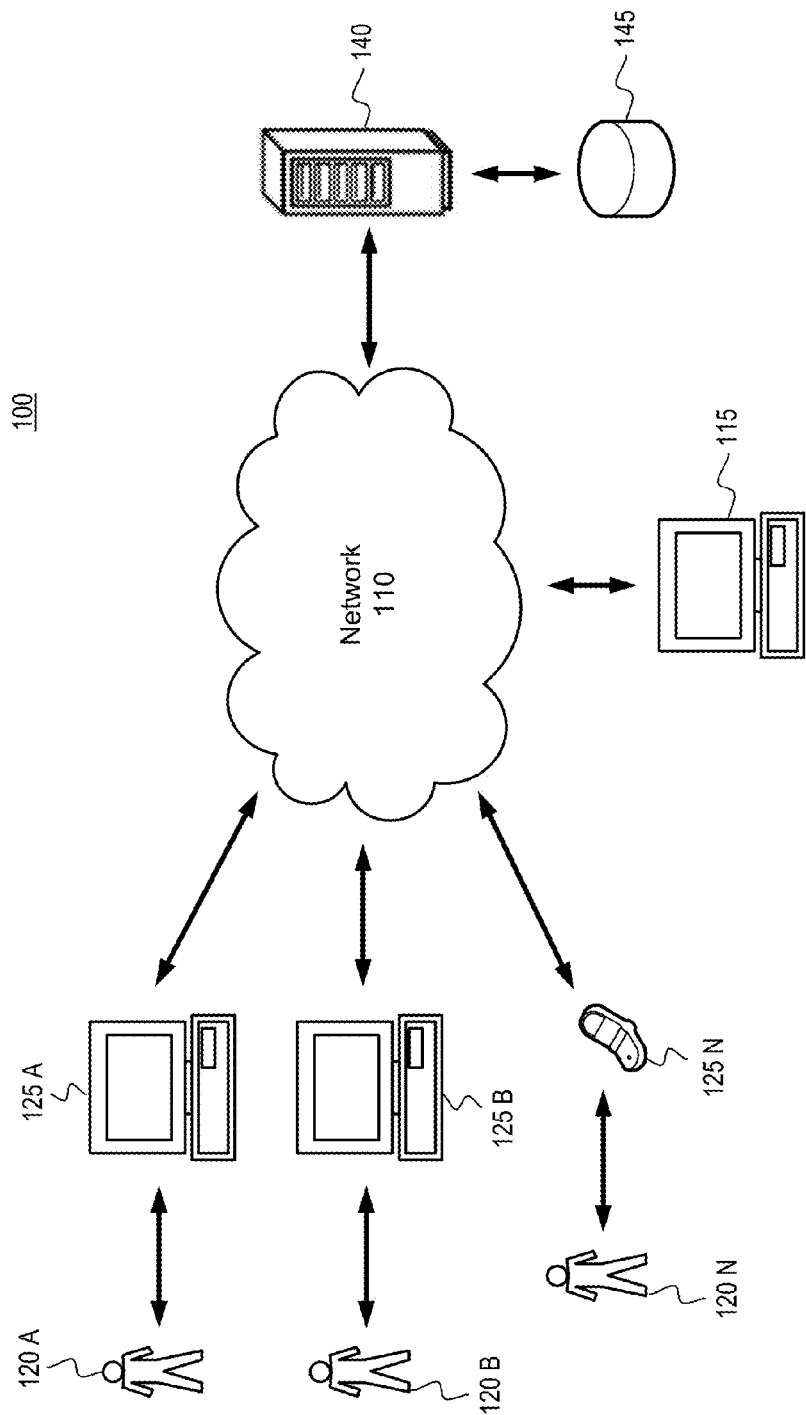
FIG. 1 is a block diagram of an example of a network environment where users may interact with each other.

Users, content generators, content providers, advertisers, website owner or providers, and/or other businesses or users may be interested in information about content that is shared, transmitted, transferred, or otherwise diffused throughout a network. FIG. 1 illustrates a simplified view of a network environment 100 with a tracking system 140 and/or data store 145 which may be used to gather and analyze information and other data about the sharing, transmission, transference, and/or diffusion of content between one or more content providers 115 and/or users 120A-120N through or across a network 110.

The network environment 100 may include one or more content providers 115. Content providers 115 may generate, create, provide, and/or sponsor content, such as web pages, websites, information, data, or other electronic content to one or more users 120A-120N. Examples of content may include text, images, audio, video, or the like, which may be processed in the form of physical signals, such as electrical signals, for example, or may be stored in memory, as physical states, for example.

A content provider 115 may be, include, and/or be operable to use a content server. A content server may include a device that includes a configuration to provide content via a network to another device. A content server may, for example, host a site, such as a social networking site, examples of which may include, without limitation, Flicker, Twitter, Facebook, LinkedIn, or a personal user site (such as a blog, vlog, online dating site, etc.). A content server may also or alternatively host a variety of other sites, including, but not limited to business sites, educational sites, dictionary sites, encyclopedia sites, wikis, financial sites, government sites, etc. A content server may provide a variety of services that include, but are not limited to, web services, third-party services, audio services, video services, email services, instant messaging (IM) services, SMS services, MMS services, FTP services, voice over IP (VOIP) services, calendaring services, photo services, or the like. Examples of devices that may operate as a content server include desktop computers, multiprocessor systems, microprocessor-type or programmable consumer electronics. Other examples are possible.

The network environment 100 may include one or more users 120A-120N that may interact with the content provider 115. Users 120A-120N may be people, businesses, machines, or entities that may connect and interact with each other, content providers 115, and/or a tracking system 140 by, through, or using the network 110. Users 120A-120N may connect with content providers 115, the tracking system 140, and/or other users over the network 110 using one or more of a web application 125A, a standalone application 115 or 125B, or a mobile application 125N, any of which may be connected to the network 110 in any configuration that supports data transfer. This may include a data connection to the network 110 that may be wired or wireless. Each of the web applications, standalone applications and mobile applications 125A-125N may individually be referred to as a client application or client device, or a user application or user device.

The web application 125A may run on any platform that supports web content, such as a web browser or a computer, a mobile phone, personal digital assistant (PDA), pager, network-enabled television, digital video recorder, such as TIVO®, automobile, television, and/or any appliance or platform capable of data communications.

The standalone application 125B may run on a machine that includes a processor, memory, a display, a user interface and a communication interface. The processor may be operatively connected to the memory, display and the interfaces and may perform tasks at the request of the standalone application 125B or the underlying operating system. The memory may be capable of storing data. The display may be operatively connected to the memory and the processor and may be capable of displaying information to the user B 125B. The user interface may be operatively connected to the memory, the processor, and the display and may be capable of interacting with a user B 120B. The communication interface may be operatively connected to the memory, and the processor, and may be capable of communicating through the network 110 with the advertising system 140. The standalone application 125B may be programmed in any programming language that supports communication protocols, such as SUN JAVA®, C++, C#, ASP, SUN JAVASCRIPT®, asynchronous SUN JAVASCRIPT®, ADOBE FLASH ACTIONSCRIPT®, or ADOBE FLEX®, amongst others.

The mobile application 125N may run on any mobile device that may have a data connection. The data connection may be a cellular connection, a wireless data connection, an internet connection, an infra-red connection, a Bluetooth connection, or any other connection capable of transmitting data. For example, the mobile application 125N may be an application running on an APPLE IPHONE®.

Content provided by the content provider 115 may be requested and/or accessed by one or more users 120A-120N. For example, a first user 120A may visit a website or webpage sponsored or provided by a content provider 115, or may access and/or retrieve various types of digital or electronic information provided by the content provider 115. A content address may be associated with the content provided by the content provider 115, and/or may be used to identify or access the content. The content address may, for example, be a universal resource locator ("URL"), web address, electronic or digital identification certificate or code, or other unique set of numbers and characters. Other examples are possible. The user may share the content address with other users, such as by copying the content address and posting, emailing, texting, or otherwise messaging the content address to one or more subsequent users who may access the content using the sent content address.

A user (sometimes referred to as an "initiating user" or "requesting user") intending to share content from a content provider 115 with other users (sometimes referred to as "subsequent users" or "recipient users") may utilize the tracking system 140 of the networking environment 100 to generate a shortened content address.

The tracking system 140 may provide many functions and benefits to network users or content providers. For example, the tracking system 140 may be useful for shortening a content address. The tracking system 140 may track a distribution and diffusion of the content provided by the content provider 115, such as by tracking the use of the shortened content address. The tracking system 140 may be useful for analyzing data and information obtained while monitoring the dissemination and distribution of content provided. Other benefits are possible.

Not all of the depicted components in FIG. 1 may be in every system, however, and some implementations may include additional components not shown in the figure. Variations in the arrangement and type of the components may be made without departing from the spirit or scope of the claims as set forth herein.

Figure 2:
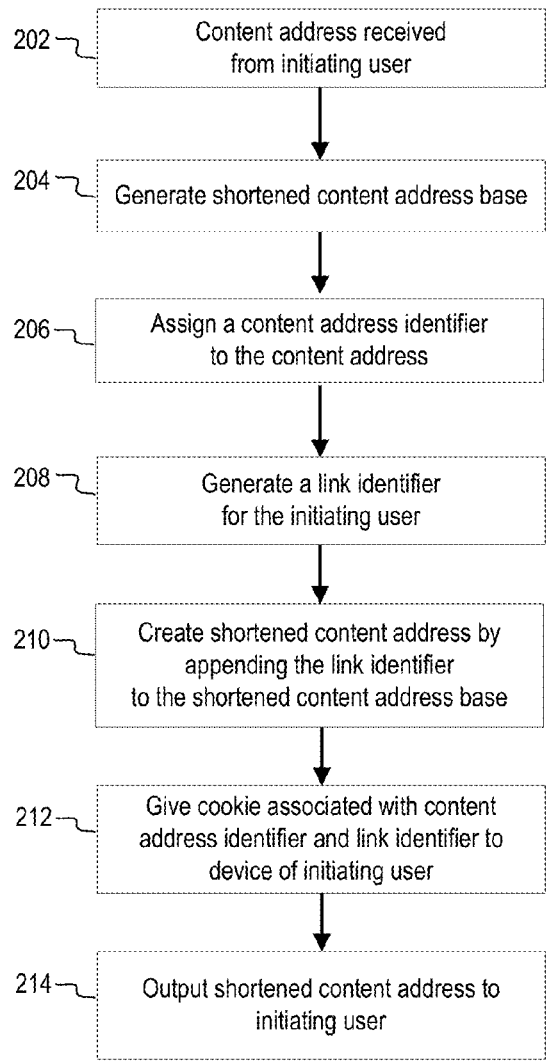
FIG. 2 is a flow diagram of an example method of shortening a content address that may be performed by a tracking system.

FIG. 2 illustrates an example method that the tracking system 140 may implement for shortening a content address. An initiating user 120A viewing content provided by a content provider 115 may identify, gather, or otherwise acquire a content address for the content. For example, the user 120A may copy a content address (such as a URL address or other web address of a web page) of content provided by the content provider 115.

Figure 3:
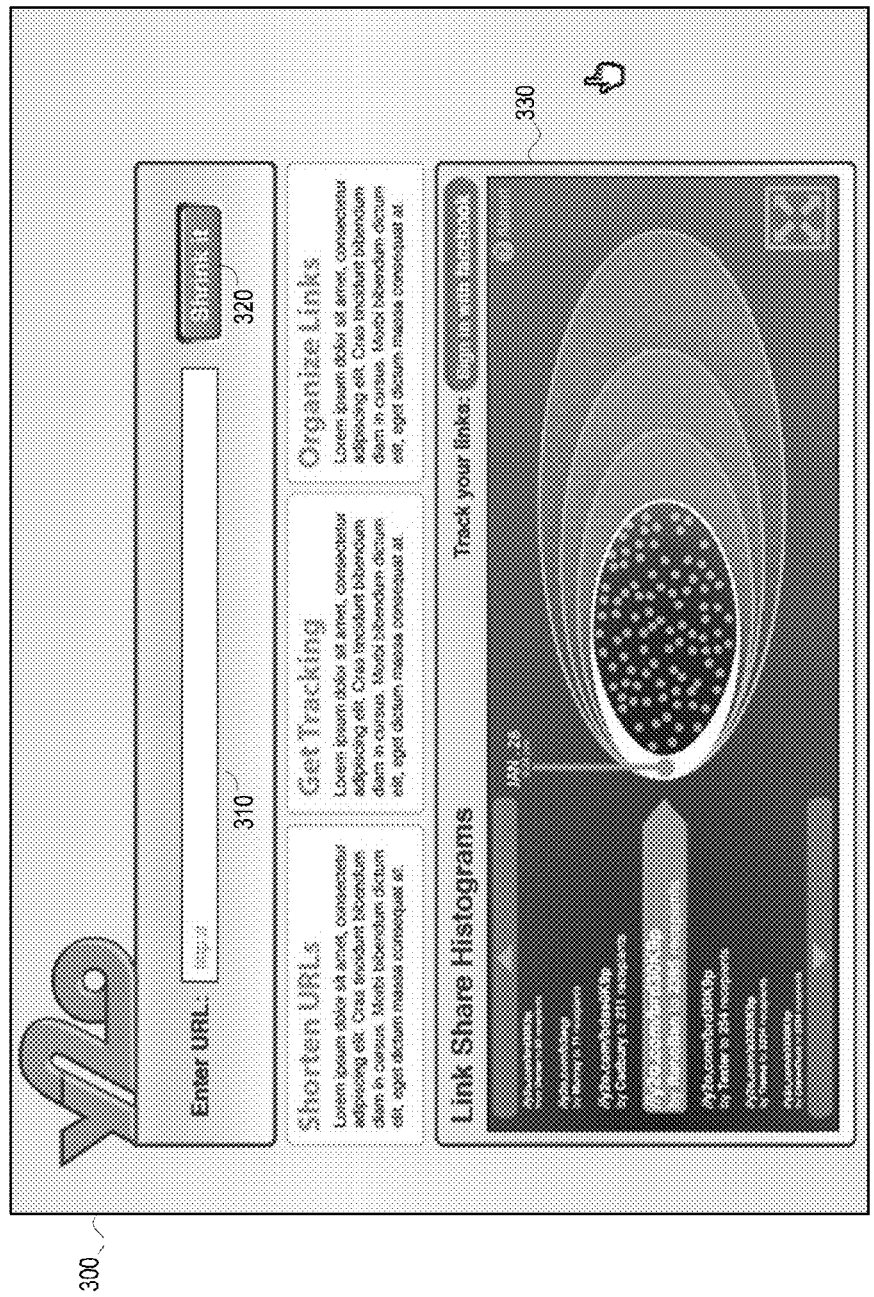
FIG. 3 is a block diagram of an example of a web site of a tracking system.

At block 202, the content address may be received by the tracking system 140 from the initiating user. The user 120A may access the tracking system 140, and/or may transmit the content address for the content to the tracking system 140 in various ways. For example, FIG. 3 shows an example of a tracking system web site 300 accessible to a user. The web site 300 may provide a user interface through which the user may send or otherwise transmit to the tracking system 140 the content address. The tracking system web site 300 may include or provide a user interface, such as a content address input module 310, through which a content address may be received by the tracking system 140. A user 120A may enter, such as by typing or pasting, the content address in to the content address input module 310. The tracking system web site 300 may also or alternatively include a shorten button 320 which, when activated, may send or transmit an entered content address to the tracking system 140. The web site 300 may additionally or alternatively include a diffusion model 330, as discussed later.

In other systems, a web browser may include a button, tab, or object which a user may select or activate while viewing content from the content provider 115 on the web browser to send the content address of the content to the tracking system 140. In some systems, the function in block 202 may be the user 120A transmitting to the tracking system 140 a tracking request or other request to track diffusion of content located at the content address. Various other ways or methods of a tracking system 140 receiving a content address from an initiating user 120A are possible.

Once the content address is received by the tracking system 140 from the initiating user 120A, the method may move to block 204, where the tracking system 140 may generate a shortened content address base.

The shortened content address base may, in some systems, be or include a reference to a webpage or website associated or related to the tracking system 140. For example, where the tracking system 140 sponsors a website 300 through which the initiating user 120A sends the tracking system 140 the content address, the shortened content address base may be or include part of the web address for the website 300. As a specific example, where the tracking system web site 300 is http://y20.com/, the shortened content address base may be or include all or part of the http://y2o.com/ address. In other systems, the shortened content address base may be a reference to a different webpage or website operated by and/or otherwise accessible to the tracking system 140. In such systems, when a shortened content address with the shortened content address base is subsequently accessed, selected, or otherwise activated, a selecting user may be directed through the tracking system 140 to the desired content, allowing for the tracking system 140 to track the user requests. In alternative systems, the shortened content address base may be generated in various other ways, and/or not be related or associated with the website 300.

In some systems, the shortened content address base may be the same for all content addresses that are shortened by the tracking system 140. In other systems, the shortened content address base may differ for one or more content addresses to be shortened. For example, the tracking system 140 may group of content addresses, either randomly or based on one or more characteristics of the content address, such that content addresses grouped together have the same shortened content address base, while content address of other groups have different shortened content address bases. In other systems, one or more shortened content address bases may be unique for each content address. Other examples are possible.

At block 206, the tracking system 140 may assign a unique content address identifier to the shortened content address base. Where the content address is a URL, the unique content address identifier may be referred to as a URL identifier. The may be assigned in or using a sequential number or character system. For example, the tracking system 140 may assign the first content address it receives a content address identifier of "1," the second content address it receives a content address identifier of "2," and so forth. In other systems, the unique content address identifier may be a randomly generated series of characters or numbers, may be assigned using unique inputs or algorithms, or may be generated or assigned in various other ways. In some systems, the content address identifier may have a predetermined length, such as four or six characters. In other systems, the content address identifier may be any length.

The content address identifier may be recorded, stored, or otherwise tracked by the tracking system 140. The tracking system 140 may enter the content address identifier in the data store 145 and/or another database or spreadsheet which may contain a portion or all of the unique content address identifiers that have been assigned by the tracking system 140. FIG. 4 an example of a database 400 including information stored by a tracking system 140 for five entries 410-414 of content addresses input by initiating users for shortening by the tracking system 140. The tracking system 140 may store in the database 400 unique content address identifiers, as in column 415, for the five entries 410-414. The tracking system 140 may also or alternatively store in the database 400 the content addresses, as in column 420, which were input by initiating users 120A for shortening. The tracking system 140 may also or alternatively store in the database 400 one or more user identifiers, as in column 430. The user identifiers may be a set of characters, letters, and/or numbers which may be unique to each user interacting with the tracking system 140. The tracking system 140 may also or alternatively store in the database 400 a timestamp, shown in column 435, which may be associated with the receipt of the content address from the initiating user and/or the request to shorten the content address. The tracking system 140 may also or alternatively store in the database 400 an IP address, shown in 440, associated with each of the receipts of content addresses and/or requests to shorten the content address. Other information may be stored for each request to shorten a content address.

Where the tracking system 140 receives a content address to be shortened more than once, either by two or more different users or by the same user at two or more different times, the tracking system 140 may generate a unique content address identifier for each. For example, entries 410, 413, and 414 all are associated with a content address of "http://yahoo-.com" to be shortened, as shown in column 420. However, as each entry represents a separate request to shorten the content address, different unique content address identifiers ("1" for entry 410, "4" for entry 413, and "5" for entry 414) were generated by the tracking system 140. In other systems, the tracking system 140 may alternatively recognize when the same user has requested the same content address to be shortened, and may refer to the previously assigned content address identifier for the new request. Other variations are possible.

At block 208, the tracking system 140 may generate a link identifier for the initiating user. The link identifier may be a randomly generated series of characters or numbers, may be assigned in a sequential order, or may be generated or assigned in various other ways. In some systems, the link identifier may have a predetermined length, such as six characters. In other systems, the link identifier may be any length. As an example, a link identifier may be a randomly generated six character series of letter and numbers, as shown in column 915 of the database 900 in FIG. 9, described later. Other examples are possible.

Figure 5:
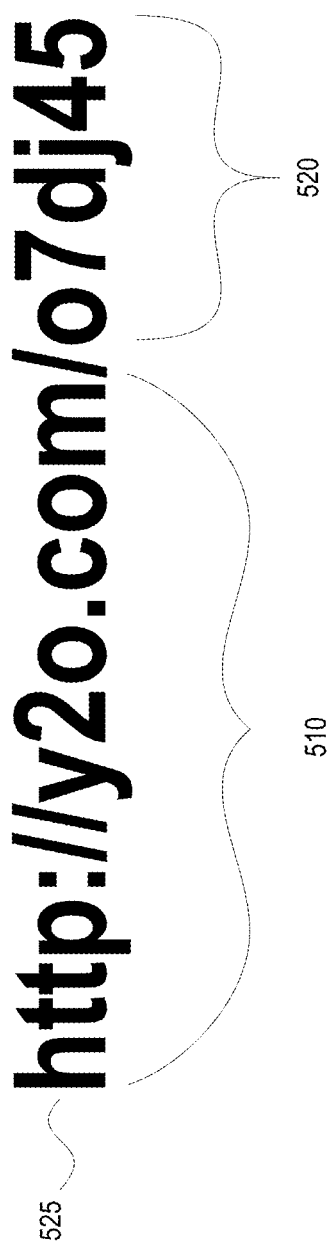
FIG. 5 is an example of a shortened content address created by a tracking system.

At block 210, the link identifier may be appended to the shortened content address base to create the shortened content address. FIG. 5 shows an example of a shortened content address 525 created by the tracking system 140 by appending a link identifier 520 to a shortened content address base 510. In the example of FIG. 5, the shortened content address base 510 is "http://y2o.com/", and the link identifier 520 is the randomly generated six character value "o7dj45." In this example, the tracking system 140 appended the link identifier 520 to the end of the shortened content address base 510 to create the shortened content address 525. Other examples of appending the link identifier 520 to the shortened content address base are possible, such as inserting the link identifier 520 between two portions of the shortened content address base 510, or beginning with the link identifier 520.

At various points after generation or identification, the link identifier 520 may be recorded, stored, or otherwise tracked by the tracking system 140. For example, the tracking system 140 may enter the link identifier 520 in a database or spreadsheet which may contain a portion or all of the link identifiers that have been assigned by the tracking system 140. The database or spreadsheet may be the same or different than the database or spreadsheet which stores the content address identifiers. FIG. 9, described later, shows one example of a database 900 where link identifiers 520 may be stored, such as in column 915 (as well as user ids in column 925, and/or unique content address identifiers in column 930). In storing information about the link identifier 520, the tracking system 140 may identify, determine, and/or store that the link identifier 520 is assigned or associated to the initiating user and/or is associated with the content address identifier previously assigned to the shortened content address. In this way, when the link identifier 520 is subsequently encountered (such as by a later user clicking on the shortened content address 525), the tracking system 140 may be able to identify the content address identifier for the shortened content address by looking up the link identifier 520 appended to the shortened content address 525. Other examples are possible.

At block 212, a cookie may be given, transmitted, stored with, or otherwise embedded with the client application 125A-125N or other device of the initiating user. The cookie may reference or indicate an association with the content address identifier and/or the link identifier. For example, the tracking system 140 may create and store a cookie whose name may be a function of the unique content address identifier and whose value may be the link identifier 520. As a specific example, where a content address identifier is "8573" and a link identifier is "abcdef," then a cookie may be created with a name "y20_8573" and having a value of "abcdef." Other examples are possible.

In subsequent accesses, interactions, or inputs of the shortened content address 525 by a subsequent user, the tracking system 140 may search a subsequent user's cookies for any link identifiers associated with the content found at the content address. In other systems, other tags or identifiers (in addition to or in place of a cookie) may be sent to and/or stored by the user or the device of the user, such as in locations that the tracking system 140 may have access to and search during later interactions with the user or user device. Other examples are possible.

Figure 6:
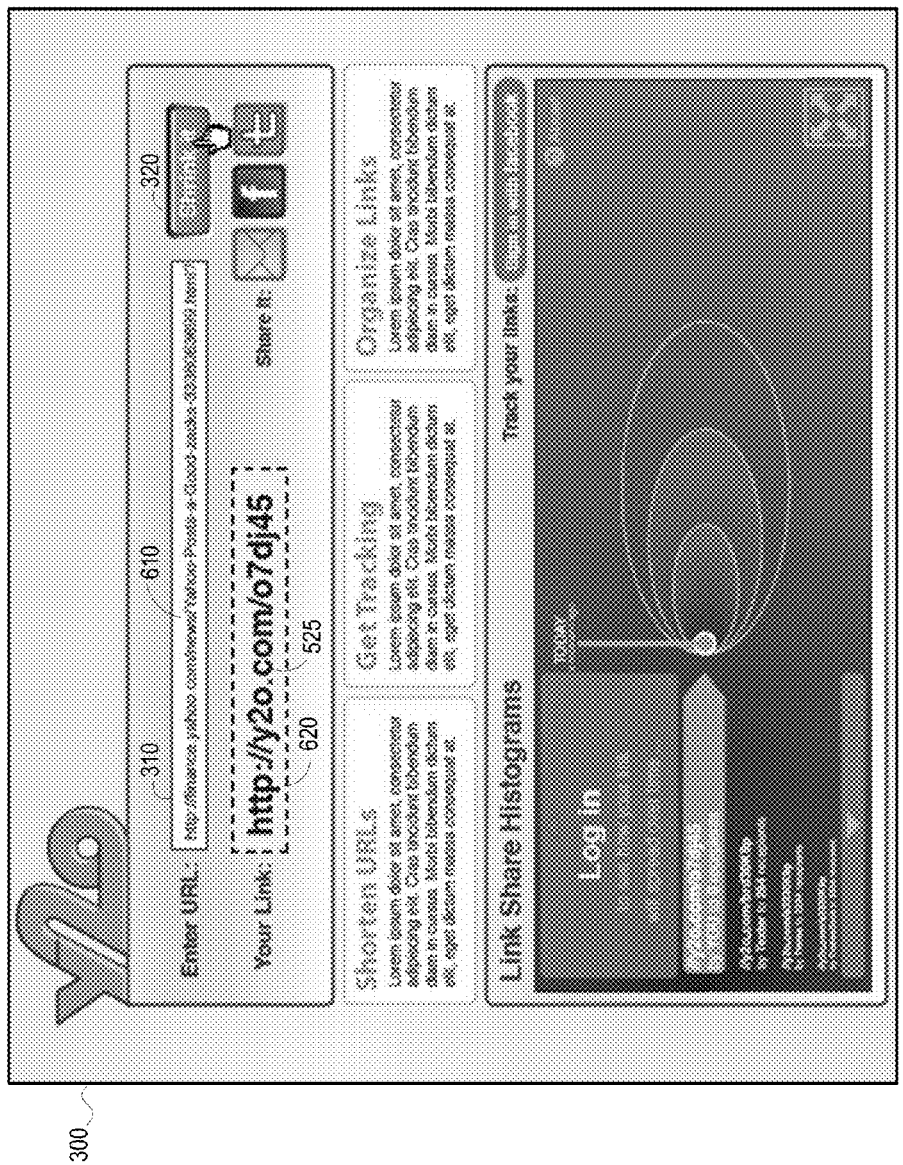
FIG. 6 is an example of a display of a web site of a tracking system displaying a shortened content address.

At block 214, the shortened content address 525 may be output to the initiating user 120A. For example, where the tracking system 140 operates a website 300 as shown in FIG. 6, the shortened content address 525 may be displayed to the user by or through an output module 620. In this example, a content address 610 was typed or pasted into the input module 310 of the website 300, and the shorten button 320 was activated or otherwise selected. Accordingly, the tracking system 140 generated the shortened content address 525 and displayed it to the user in the output module 620. In other systems, a shortened content address 525 may be output to a user through a text message, email, clickable hyperlink, or other digital message, or may be transmitted or displayed in various other ways.

While FIG. 2 shows one method of generating and using a shortened content address 525, many other methods are possible. Other methods may include fewer or more blocks or functions. For example, in some systems, no cookie may be generated or given to the initiating user. In some methods, one or more steps may be performed in a different order. As an example, in some variations, block 212 of the method of FIG. 2 may be performed after block 210. Other variations are possible.

Once the shortened content address 525 is generated and output to the initiating user, the initiating user 120A may use the shortened content address 525 to access the content at the content address 610. For example, where the shortened content address 525 is output as a hyperlink, the user may click on the shortened content address 525. Alternatively, where the shortened content address 525 is output as text, the user may copy the shortened content address to an address bar of a web browser. The user 120A may also or alternatively share the shortened content address 525 with other users over the network 110. For example, the initiating user 120A may copy the shortened content address 525 and/or post the shortened content address 525 to a message board, website, social network, or other forum, or may email, text, or otherwise transmit the shortened content address 525 to one or more friends or other subsequent users. Other methods and ways of access content at the content address 610 using the shortened content address 525 are possible.

When any user, including the initiating user 120A or any subsequent user, inputs, interacts with, accesses, or otherwise selects the shortened content address 525 (such a user may be referred to as a "selecting user," "requesting user," or "subsequent user"), the tracking system 140 may monitor or be alerted to the request. For example, where the shortened content address 525 includes a shortened content address base 510 that is associated with or related to the tracking system 140, the requesting user may be directed or routed to the tracking system 140. The tracking system 140 may recognize the shortened content address 525 by the link identifier 520 within the shortened content address 525. The tracking system 140 may use a database or table that stores some or all link identifiers generated by the tracking system 140 to search for and identify the content address identifier corresponding to the link identifier 520 of the shortened content address 525. Using the link identifier 520, the tracking system 140 may determine the content address 610 associated with the content address identifier 525.

Once the tracking system 140 identifies the content address that the user is seeking by interacting with the shortened content address 525, the tracking system 140 may direct the user to the content address 610. The tracking system 140 may, in some instances, insert or otherwise place a navigation bar or toolbar, such as toolbar 720 described below, into the display at the content address 610. Alternatively, the tracking system 140 may gather and/or display the content from the content address 610 in a frame or display generated by the tracking system 140, such as by or at the tracking system website 300. Other variations are possible.

Figure 7:
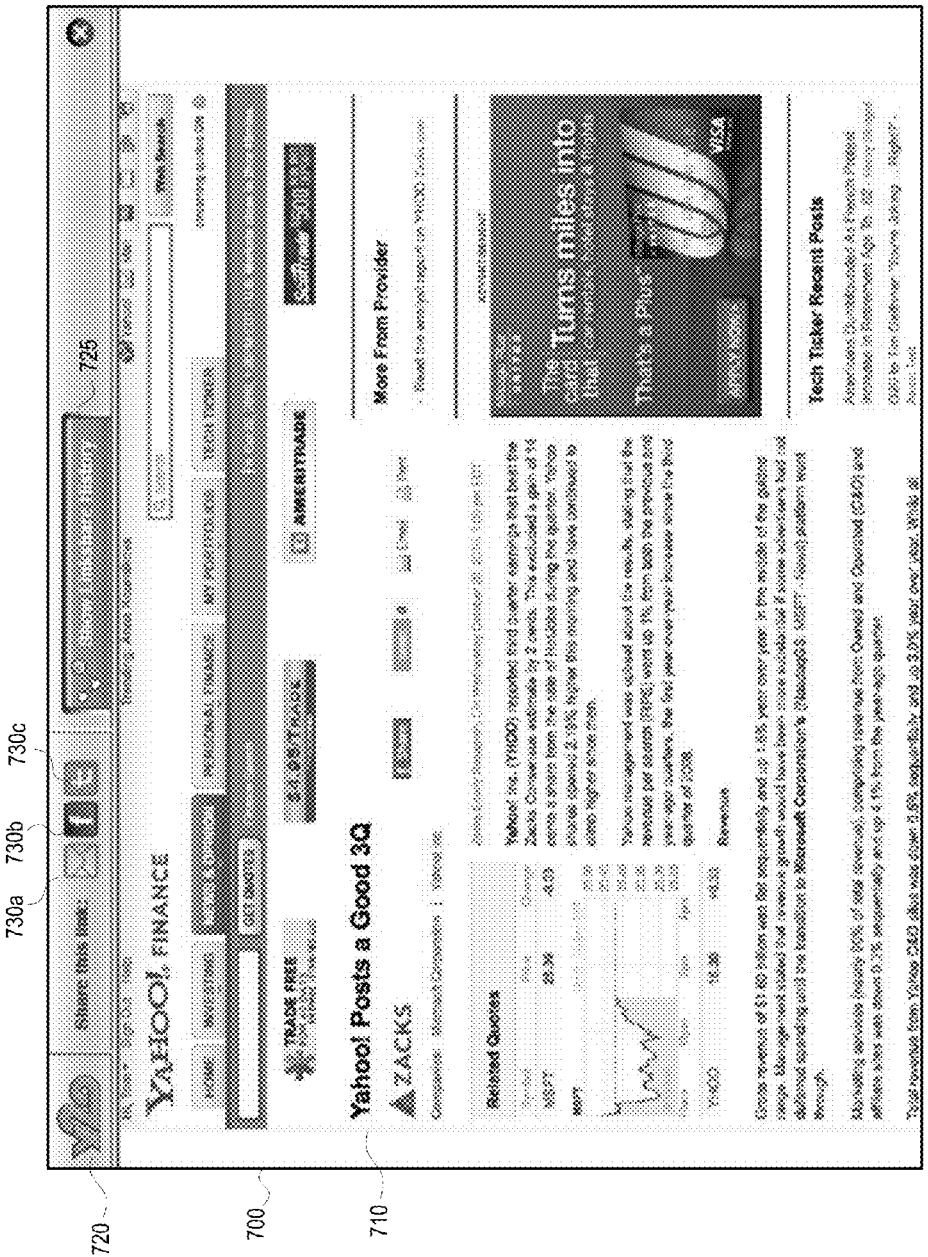
FIG. 7 is an example of a display of content from a content address provided by a content provider in a display.

FIG. 7 is an example of a display 700 generated by the tracking system 140 displaying content 710 from the content address 610 in a frame or webpage provided by the tracking system 140. The display 700 may represent a display of content at a content address 610 with a toolbar 720 inserted into the display 700, or may represent a display 700 of the content from the content address 610 gathered and displayed in a frame generated by the tracking system 140.

In the display 700, the tracking system 140 may include a toolbar 720. The toolbar 720 may include one or more share inputs 730a-730c. When selected, clicked, or otherwise activated by a user or other viewer of the display 700, a requesting or viewing user may be able to share the shortened content address 525 of the content 710 with one or more other subsequent users in various ways. For example, the share input 730a may allow a user to email or message the shortened content address 525 to one or more subsequent users. As another example, the share inputs 730b and 730c may allow a user to post the shortened content address one on or more social media sites or other sites. Other examples are possible.

Additionally or alternatively, the toolbar 720 may include a mapping input 725. When activated, the mapping input 725 may allow a user to view one or more diffusion models 330 and tracking, diffusion, or other information about the shortened content address 525. Fewer or more buttons, tabs, or inputs may be included in a toolbar 720. In some systems, the tracking system 140 may also include an address module or bar which may include the shortened content address 525 that was used to generate the display 700 with the content 710 from the content address 610. In some systems, the shortened content address 525 may be displayed in or with a browser, such as in an address bar of a web browser. Other examples are possible.

In still other systems, a user may be directed to the content 710 at the content address 610 without any frame or display being provided by the tracking system 140 or tracking system website 300. Various other examples of displays of the requested content 710 are possible. In any of these ways, subsequent users may be able to reach content located at the content address using the shortened content address 525 obtained from the initiating user or a new shortened content address generated for a subsequent user. In some systems, the tracking system 140 may be configured to shorten a content address and direct the user to the content in a very fast period of time, such that the redirection to the content may appear to happen instantaneously or closely proximate to the request for a shortened content address.

In some systems, the tracking system 140 may be configured to provide an initiating user 120A, when entering a content address into the tracking system 140 to be shortened, the option to include the toolbar 720 in a frame whenever a subsequent user accesses the content using a shortened content address, and/or to determine how content will be displayed to any such subsequent user. In other systems, the parameters of a display of content by the tracking system 140 may be set automatically and/or prior to an initiating user, and may not be changed. In some systems, the tracking system 140 may allow an initiating user 120A, when entering a content address into the tracking system 140 to be shortened, to choose to keep some or all data and information about tracking and diffusion of the content private (for the initiating user, selected users, and/or the tracking system 140) or public (available to everyone). If private, the tracking system 140 may require a user to log in before performing the shortening of the content address and/or to view any tracked diffusion data or information. Other variations are possible.

The tracking system 140 may generate shortened content addresses by generating a unique string for each combination of content address and user, which may differ and a content shortener that may generate a unique string only for each content address. Using a unique string for each combination of content address and user may allow the tracking system 140 to track the diffusion of content.

Figure 8:
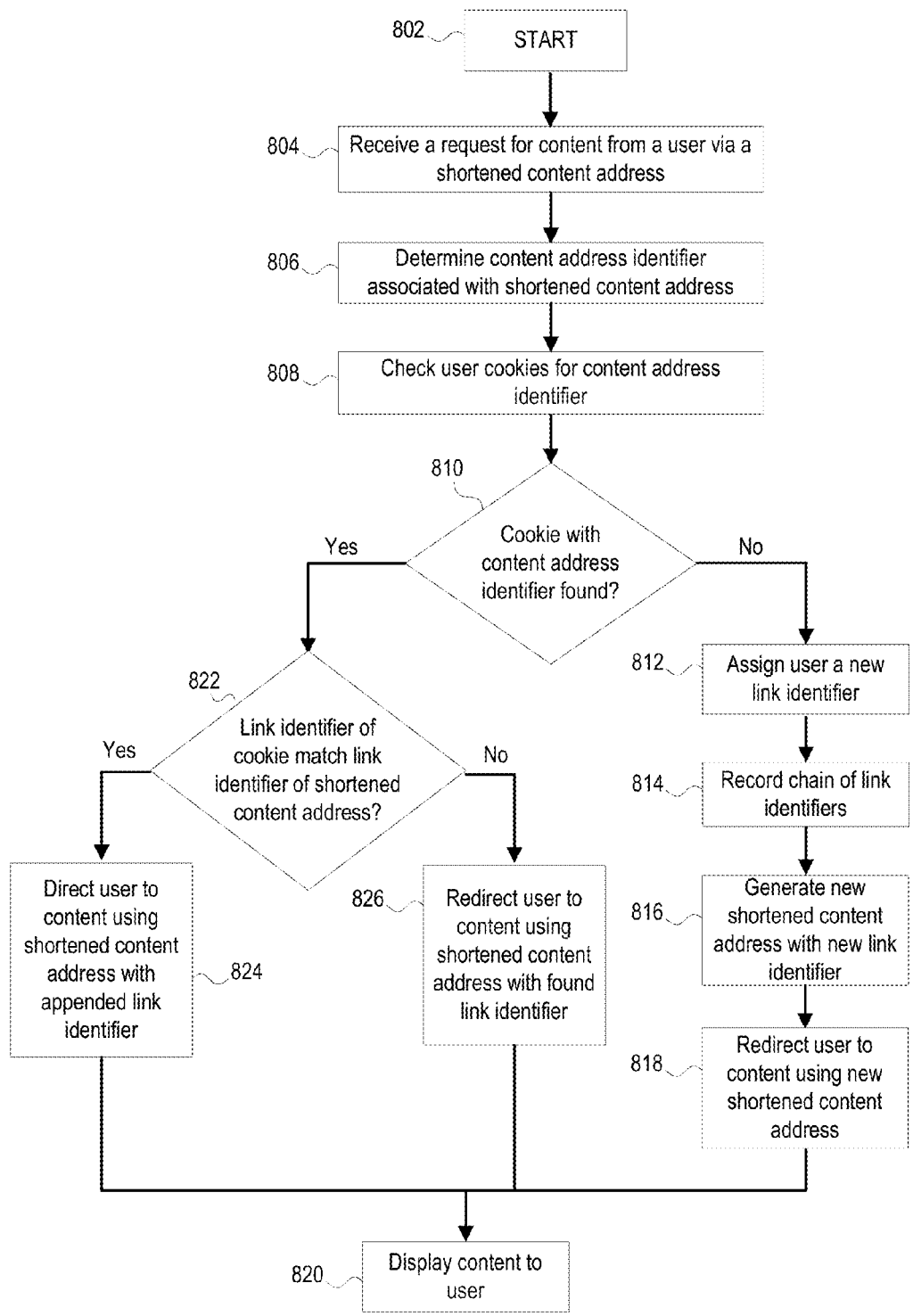
FIG. 8 is a flow diagram of an example method of tracking and monitoring a dissemination and distribution of content.

In addition to generating shortened content addresses 525, the tracking system 140 may be configured and/or used for tracking and monitoring dissemination, diffusion, and distribution of the content provided by the content provider 115. FIG. 8 is an example method that the tracking system 140 may perform for tracking and monitoring dissemination, diffusion, and distribution of a shortened content address 525 between and among one or more users 120A-120N.

The method may begin at block 802. At block 804, the tracking system 140 detects or otherwise receives a selection, activation, or request for information from a selecting or requesting user through a shortened content address 525 (sometimes referred to as content requests). A user may, for example, click on a hyperlink representing the shortened content address 525. As another example, the user may enter the shortened content address 525 into a URL input or address bar of a web browser. In some systems and methods, the shortened content address 525 may include a shortened content address base 510 that directs the requesting user to the tracking system 140. In other systems and methods, the tracking system 140 may actively monitor or survey requests for information from one or more content addresses 610 or shortened content addresses 525 that are entered by users (such as those entered into web browsers, search engines, or connected to via a hyperlink). Various other examples of detecting a selection, activation, or request from a selecting user by the tracking system 140 are possible.

Once detected, the tracking system 140 may identify, detect, and/or gather the shortened content address 525. The tracking system 140 may, for example, copy or gather the shortened content address 525 from the browser used by the user, or in various other ways.

At block 806, the tracking system 140 may determine the content address identifier associated with the shortened content address 525. The tracking system 140 may, for example, first identify the link identifier 520 associated with the shortened content address 525. The tracking system 140 may identify the shortened content address base 510 of the shortened content address 525, and may determine or otherwise recognize that everything after the shortened content address base 510 may be or represent the link identifier 520. Other ways of determining, identifying, or gathering the link identifier 520 from the shortened content address 525 are possible.

Once the link identifier 520 is identified, the tracking system 140 may look up the link identifier 520 in one or more database or spreadsheet, such as the database 900 shown in FIG. 9 and discussed below, to determine the content address identifier that is associated with the link identifier 520. The content address identifier may be unique and associated with only one content address.

At block 808, the tracking system 140 may search or check cookies associated with the selecting user, client application, or the selecting user's device for the content address identifier associated with the link identifier 520. The tracking system 140 may search some or all cookies associated with the user, client application 125A-125N, or the user device. The tracking system 140 may identify, detect, gather, or otherwise determine any cookies that have a name which may include or match the content address identifier that the tracking system 140 identified in block 806. For example, a cookie which was named based on or including a content address identifier (such as where a content address identifier is "8573" and a cookie has been created with a name "y20_8573"), the tracking system 140 may identify all cookies having the content address identifier in the name. Various other examples and ways of searching a user device for cookies associated with a content address identifier are possible. At block 810, the tracking system 140 may determine whether any cookies associated with the content address identifier were found when searching the user cookies.

If no cookies associated with the content address identifier are found in the cookies of the user, user's device, or client applications, the method may proceed to block 812. This may occur, for example, when the user is not the initiating user and clicks on a shortened content address for the content for the first time.

At block 812, the tracking system 140 may assign a new link identifier to the selecting user. The new link identifier may be generated randomly, sequentially, or in any other way previously described for generating a link identifier. For example, the new link identifier may be generated in a manner the same or similar to the generation of the link identifier performed in block 208 of the method of FIG. 2. The new link identifier may be a unique set of characters or numbers, and/or may not be the same as the link identifier appended to the selected shortened content address ("appended link identifier").

At block 814, the tracking system 140 may store, record, or otherwise track the interaction or entry, as well as an identified chain of link identifiers. The tracking system 140 may, for example, record the new identifier and associate the new link identifier with appended link identifier. The tracking system 140 may also or alternatively note that the new link identifier is associated with the content address identifier.

FIG. 9 shows one example of a database 900 used by a tracking system 140 to track diffusion of content. The database 900 may include one or more entries 910-914. Each entry 910-912 may either be associated with a detection of a shortened content address 525 by the tracking system 140 where no cookies with the name, or otherwise having, the content address identifier was found by the tracking system 140 in the user's cookies (such as in entries 910-911); or alternatively is associated with a shortened content address 525 used by an initiating user (such as in entries 912-914). For the latter set of entries 912-914, a blank space or entry of NULL in the parent line may indicate that the entry corresponds to an initiating user who shortened a content address using the user interface. Other variations are possible.

For each such entry 910-914, the tracking system 140 may store a new "link identifier," as shown in column 915. For selecting users where no cookie was found for the selecting user (such as with entries 910-912), the link identifier is a "new link identifier" different from the original appended link identifier. Where an entry 910-911 represents a viewing of content using a shortened content address 525 received from a previous user, the tracking system 140 may also store parent information 920 in the database, identifying the original "appended link identifier" of the shortened content address 525 used by the selecting user. For each of the entries 910-911, each time a child link is created, such as in block 812, a parent link may be entered in the database 900.

For example, once a new link identifier is generated by the tracking system 140, the tracking system 140 may record that the parent of this new link identifier is the link identifier of the content address 610 that the user originally clicked on to access the content. As a specific example, the user associated with entry 910 accessed the content 710 using a shortened content address 525 that was created or generated for the user associated with entry 911. As such, the parent information 920 for the entry 910 includes the link identifier 520 for the entry 911.

Additionally or alternatively, for each entry 910-914, the tracking system 140 may also store one or more of a user identifier 925, content address identifiers (or URL identifier) 930, a time stamp 935, and/or an IP address 940 for the user or user device associated with the entry 910-914. Other variations or types of data may be stored by the tracking system 140.

At block 816, the tracking system 140 may generate a new shortened content address for the selecting user with having no cookies associated with the content address identifier. The new shortened content address may include the same shortened content address base 510 with the new link identifier appended to it. As an example, referring to FIG. 9, the new link identifier "03EXem" may be generated for the entry 910, where the entry 910 is associated with a user for which no previous link identifier associated with the content address was found. The new link identifier may be appended to the shortened content address base 510 in various ways, such as the ways in block 210 of the method of FIG. 2, to generate the new shortened content address.

At block 818, the tracking system 140 may direct the user to the content using the new shortened content address. In block 820, the desired content 710 may be displayed. The tracking system 140 may display or ensure the display of the content 710 in various ways, such as in any of the ways previous described or shown in FIG. 7. The new shortened content address generated for the requesting user may also or alternatively be displayed to the selecting user. For example, the new shortened content address may be a shortened URL that may be displayed at the top of a web page or at a different point in a display. In other examples, the selecting user may be shown the content in a display that may have a toolbar 720. The share inputs 730a-730c may be configured such that if this subsequent user selects one of the share inputs 730a-730c, the new shortened content address (generated at block 716) may be sent to other users or posted on one or more social media sites. Other examples are possible.

Returning to block 810, if a cookie having the content address identifier as a name is found by the tracking system 140 in the user's cookies, the method may proceed to block 822. At block 822, the tracking system 140 may determine whether or not a link identifier of the cookie matches the link identifier that was appended to the shortened content address that was selected by the user ("appended link identifier").

The link identifier of the cookie (sometimes referred to as "cookie link identifier") may be identified in various ways. For example, where a name of a cookie is or includes the content address identifier and the value of the cookie is the link identifier (such as where a content address identifier is "8573", a link identifier is "abcdef", and a cookie is created with a name "y20_8573" and a value of "abcdef"), the link identifier may be identified by determining the value of the cookie having the content address identifier in the name. Various other methods are possible.

If the link identifier of the cookie with the content address identifier matches the appended link identifier, the method may proceed to block 824. This situation may occur, for example, where an initiating user clicks on a shortened content address 525 that the initiating user requested be generated by the tracking system 140. This situation may also occur, for example, where a subsequent user who previously clicked on a shortened content address having a first link identifier (abcdef, for example) and was given a new shortened content address with a new link identifier (fedcba, for example), then accessed the content using the new shortened content address and new link identifier (fedcba). Other examples are possible.

At block 824, the tracking system 140 may direct the user to the content using the shortened content address that the user had originally selected (i.e. the shortened content address with the appended link identifier). At block 820, the content may be displayed to the user. The display of the content to the user may be the same as or resemble the display of the content to the user previous described, and/or may include the original shortened content address.

Returning to block 822, where the link identifier identified from the cookie with the content address identifier does not match the appended link identifier, the method may proceed to block 826. At block 826, the user may be directed to the content using a shortened address with the found link identifier. This situation may also occur, for example, where a selecting user who previously clicked on a shortened content address having a first link identifier (abcdef, for example) and was given a new shortened content address with a new link identifier (fedcba, for example), then accessed the content using the first shortened content address and first link identifier (abcdef). Other examples are possible.

At block 820, the content may be displayed to the user. The display of the content to the user may be the same as or resemble the display of the content to the user previous described, and/or may include the shortened content address with the found link identifier. Other examples are possible.

Additional or fewer steps may be incorporated into variations of the method performed in FIG. 8. For example, in some systems, the decision block in 822 may not be necessary. In some of these systems, so long as a cookie associated with the content address identifier is found, the system may proceed by directing the user to the content using a shortened content address with the link identifier associated with the cookie, and then move to block 820. Other variations are possible. Additionally, some steps in FIG. 8 may be performed in a different order or simultaneously.

The database 900 shown in FIG. 9 may be originated and created in various ways. In some systems, the tracking system 140 may create a new database or subset of a database each time an initiating user 120A submits a tracking request or a content address to be shortened. The tracking system 140 may create and store a first entry in the database or subset of the database for the initiating user. The first entry may include one or more of a content address identifier for the content address associated with the tracking request or shortening request (see column 930), a link identifier generated for the combination of initiating user and content address (see column 915), a user identifier for the initiating user (see column 925), timestamp information related to the tracking request or shortening request, and/or an IP or other information related to the device or service used by the initiating user.

For each subsequent content request or other interaction with the tracking system 140 that is associated with the same content address identifier and a unique or different user not previous associated with the content address identifier (such as the receipt of a shortened content address with a link identifier associated with the content address identifier), the tracking system 140 may create and store a new entry in the database or subset of the database. In addition to storing some or all of the types of information stored with the first entry, each subsequent entry may also include parent information (see column 920). The parent information may be a link identifier in the shortened content address used in the content request. Other examples of generating a database or storing or tracking information are possible.

Figure 10:
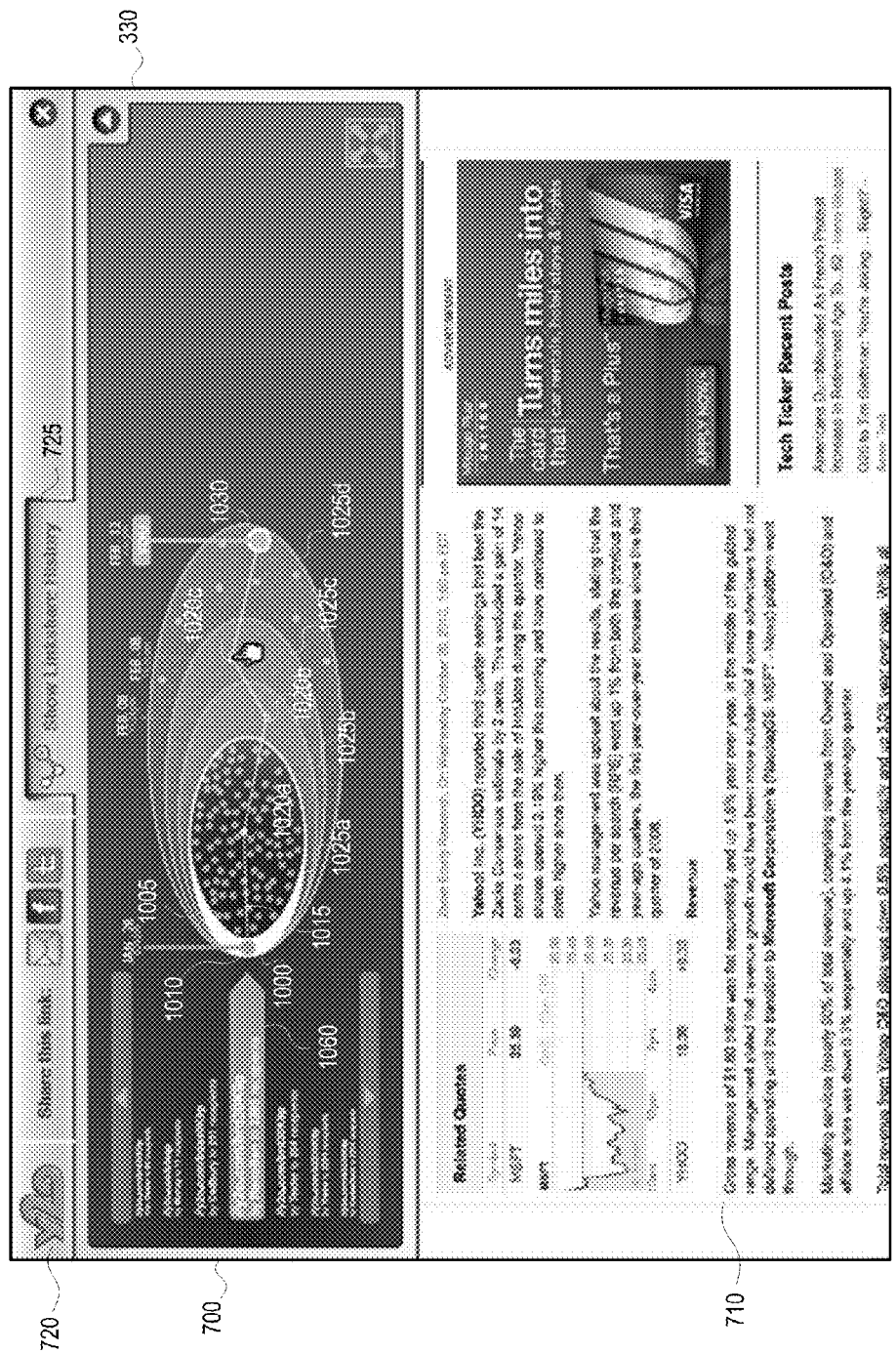
FIG. 10 shows an example of a display of a tracking system website displaying content and tracking information.

As discussed, when content 710 from a content provider is gathered by the tracking system 140, the tracking system 140 may display the content 710 in a display 700, and/or may include or otherwise insert a toolbar 720. FIG. 10 shows an example of the display 700 when the mapping input 725 has been selected.

When the mapping input 725 is selected, a diffusion model 330 may be displayed. The diffusion model 330 may include and/or display detailed information about the diffusion of content, a chain structure, and/or user locations. The diffusion model may visually illustrate associations between entries in a database (such as the database 900) and/or interactions with a tracking system 140. In some instances, the diffusion model 330 may replace the content 710 or take up the entire display 700. In other instances, the diffusion model 330 may only take up a portion of the display 700. In these instances, the content 710 may be shifted to the unused portions of the display 700, or the diffusion model 330 may overlay the content 710 below the diffusion model 330. Other examples are possible.

The tracking system 140 may generate or create the diffusion model 330. The diffusion model 330 may be associated with or relate to the content 710 located at the content address 610. Alternatively, the diffusion model 330 may be a sample diffusion model 330, such as the sample diffusion model 330 shown in FIG. 3, or may be unrelated to the content 710.

The diffusion model 330 may map, illustrate, or otherwise display tracking and/or diffusion information gathered, tracked, or analyzed by the tracking system 140 about the content 710 located at the content address 610 and originating from the first shortened content address 525 created by an initiating user. Other examples of diffusion models 330 are possible.

The diffusion model 330 may be represented in many different ways. For example, the diffusion model 330 may include a map, graph, chart, model, or other display. One example of a diffusion model representation may be as a ripple display 1000. The ripple display 1000 may include one or more points 1005, 1010, 1020a-1020c, 1030. Each point 1005 may represent one entry in the database 900, and/or may represent one instance of a unique user requesting the content 710 using a shortened content address 525 generated by the tracking system 140. Each point 1005 may be traced back, directly or indirectly, by some unbroken path of adoptions back to the original point 1010. In some instances, new points may be generated or created in the ripple display 100 only when a new user requests the content 710 using a shortened content address 525 generated by the tracking system 140, but may not be generated or created when a repeating user requests the content 710 for a second or subsequent time. In other instances, new points are created every time a user requests content 710 using a shortened content address 525 generated by the tracking system 140.

Point 1010 may represent the first view of the content 710 by a shortened content address 525 created by the tracking system 140 for an initiating user. Point 1010 may be the first instance (in this chain) where an initiating or requesting user entered the content address 610 into the tracking system 140 and generated the content address 525. Point 1030 may represent the present view of the content 710 by a shortened content address created by the tracking system 140 for the present user.

A line or diffusion path 1015 may connect the points 1020a-1020c between the present point 1030 and the point 1010 corresponding to the initiating user, demarcating the path through which the information or data spread from the initiating user to the present user. The line or diffusion path 1015 may represent, visually or graphically, the chain structure and/or series of link identifiers that have been recorded in a database for the present shortened content address. The line or diffusion path 1015 may be generated by tracing the chain history through or using the database displayed in FIG. 9.

For example, point 1020*a* may represent a second user who accessed or requested the content 710 using the shortened content address 525 created for the user at point 1010. At point 1020*a*, the tracking system 140 may generate a new link identifier for the second user, and direct the second user to the content 710 using a second shortened content address. In this example, point 1020*b* may represent a third user who accessed or requested the content 710 using the second shortened content address created by the tracking system 140 at point 1020*a*. At point 1020*b*, the tracking system may generate a new link identifier for the third user, and direct the third user to the content 710 using a third shortened content address. In this example, point 1020*c* may represent a fourth user who accessed or requested the content 710 using the third shortened content address created by the tracking system 140 at point 1020*b*. At point 1020*c*, the tracking system may generate a new link identifier for the fourth user, and direct the fourth user to the content 710 using a fourth shortened content address. Point 1030 may represent the user presently viewing the content 710. The present user may have accessed or requested the content 710 using the fourth shortened content address.

The ripple display 1000 may include one or more boundaries 1025*a*-1025*d*. One or more points may be displayed within each boundary 1025*a*-1025*d*. Each boundary 1025*a*-1025*d* may include some or all points 1005 for users accessing or requesting content 710 using a shortened content address for a previous point 1010, 1020*a*-1020*c*, and 1030. For example, within boundary 1025*a*, the tracking system 140 may show some or all points 1005, 1020*a* that are associated or related to users accessing or requesting content 710 using the shortened content address 525 generated or created for the user at point 1010. Between boundary 1025*a* and 1025*b* the tracking system 140 may display some or all points 1020*b* that are associated or related to users accessing or requesting content 710 using the second shortened content address generated or created for the user at point 1020*a*. Between boundary 1025*b* and 1025*c* the tracking system 140 may display some or all points 1020*c* that are associated or related to users accessing or requesting content 710 using the third shortened content address generated or created for the user at point 1020*b*. Between boundary 1025*c* and 1025*d* the tracking system 140 may display some or all points 1030 that are associated or related to users accessing or requesting content 710 using the third shortened content address generated or created for the user at point 1020*c*. In some systems, such as where the content has been shared a large number of times, not all of the points may be displayed between or within one of the boundaries 1025*a*-1025*d*.

In another system, each boundary may represent a degree of separation from the initial point 1010, even if all points in the boundary are not directly traceable to the highlighted point of a diffusion path 1015. Other examples are possible.

In some systems, the ripple display 1000 may be interactive. A user viewing the diffusion model 330 may be able to click or otherwise select one or more of the points 1005, 1010, 1020*a*-1020*c*, 1030. Information about the selected point 1010 may be displayed as an entry or summary 1060 in the diffusion model 330. Each snapshot 1060 may include the shortened content address (such as "//y2.com/brd30K9p" for the summary 1060) associated with that point 1010, a user name or other user identifier (such as "RenoBan") associated with the point 1010, and/or a number of recipients (such as "2395 recipients") who have viewed the content 710 using the shortened content address associated with the point 1010. In other instances, different information may be displayed or listed with each summary 1060. In some instances, more than one entry may be displayed at any time, and/or a user may be able to scroll through the summaries 1060 that are displayed. In some instances, the most relevant summaries 1060, such as the summaries associated with the diffusion path 1015, may be displayed or listed. In other instances, no summaries 1060 may be displayed. Other variations are possible.

Figure 11:
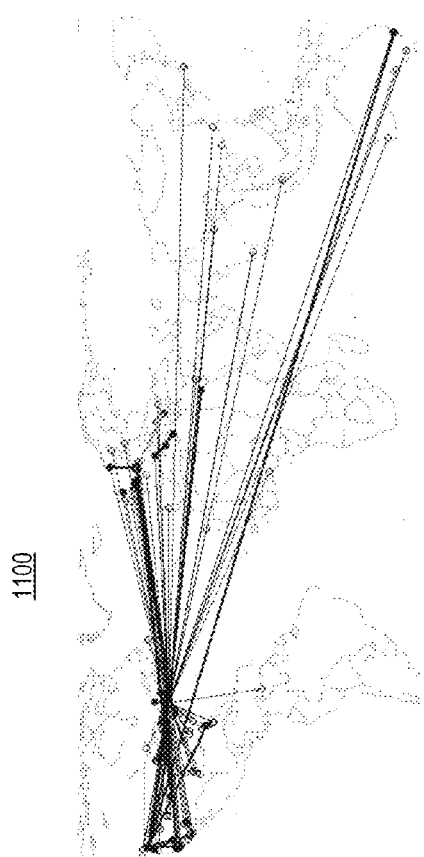
FIG. 11 shows an example of a model generated by the tracking system.
Figure 12:
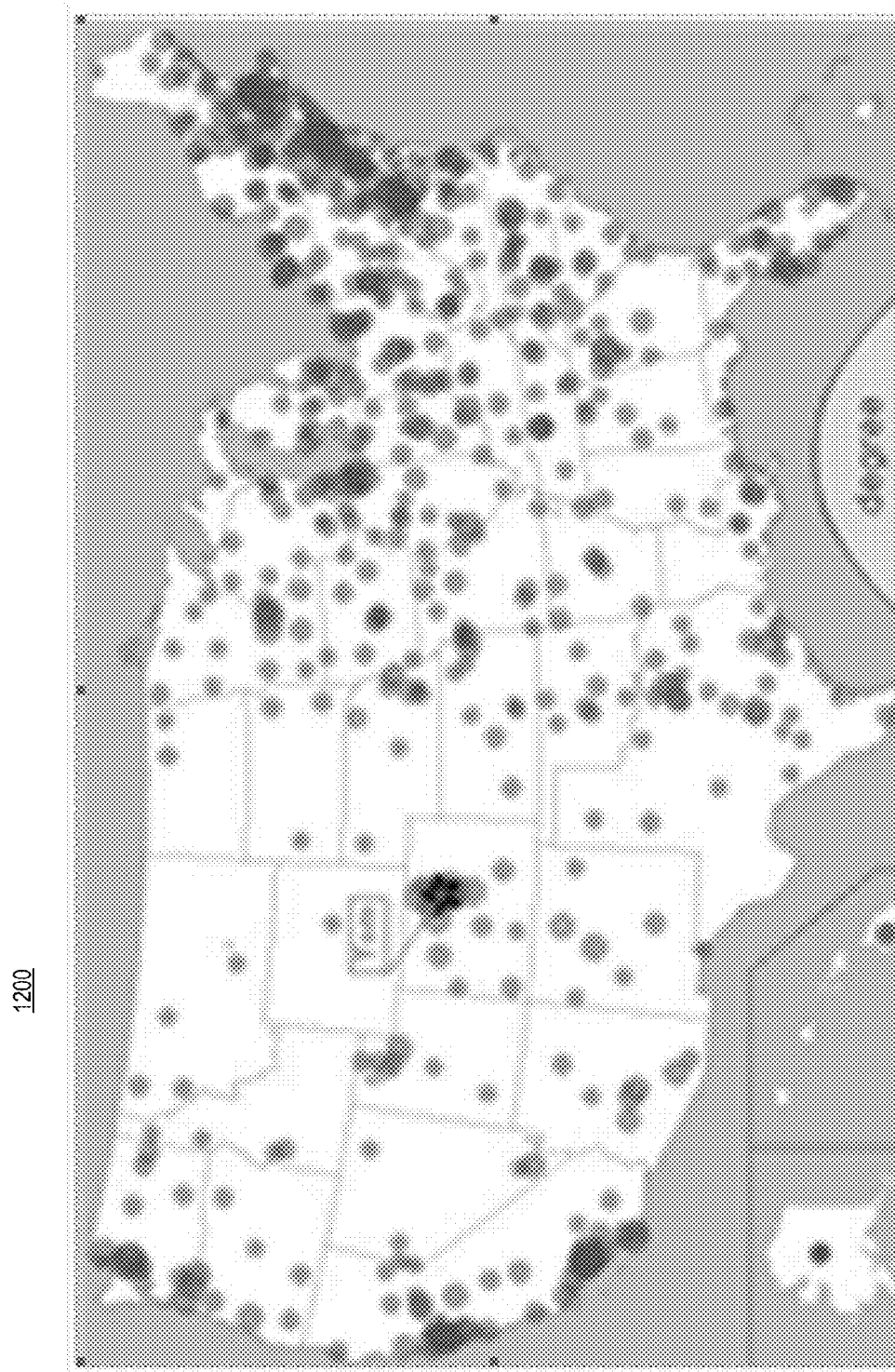
FIG. 12 shows an example of a model generated by the tracking system.

The tracking system 140 may generate one or more other visual and/or interactive graphs or maps, which may be displayed with or in place of the diffusion model 330 shown in FIG. 10. For example, the tracking system 140 may generate a geographic map, such as geographic map 1100 in FIG. 11 or geographic map 1200 in FIG. 12, showing how content has been shared and diffused throughout a geographic region, such as a state, country (see geographic map 1200), or the world (see geographic map 1100). Each representation may include one or more points and lines which are particular to each interaction or sharing of content, as shown in the geographic map 1100 in FIG. 11. Alternatively, each representation may include one or more indicators showing a concentration of sharing or diffusion of content, as shown by the darker red areas of the geographic map 1200 of FIG. 12. In still other examples, the tracking system 140 may generate one or more report analyzing, describing, and/or showing some or all information about diffusion or tracked sharing of content. In still other examples, the tracking system 140 may generate or otherwise create one or more graphs, charts, figures, reports, or summaries which may describe, show, or explain data or information about diffusion or tracked sharing of content. Other examples are possible.

In some systems, the tracking system 140 may also or alternatively be configured or operable to record "conversion" or other user information such as interests, click-throughs, or purchases, on one or more websites or with one or more content providers. Willing web sites or content providers may, for example, include a line or JavaScript or other code in their content or webpages. The tracking system 140 may then, for example, generate one or more metrics, such as a number of "viral" conversions or other metrics. In this example, if the willing web site or content provider is accessed directly through a content address that was not generated by the tracking system 140, the website or content provider may transmit user data to the tracking system 140 together with a unique identifier that may identify the site owner or content provider. In some of these instances, the web site or content provider may communicate with the tracking system 140 by dynamically changing the src attribute of an image on the content page. If, in this example, the willing website or content provider is instead accessed via a shortened content address generated by the tracking system 140, the tracking information may be tied to the user identifier associated with the shortened content address. In this situation, the website or content provider may send the tracking data to a top document window via code, such as a JavaScript postMessage function. Upon receiving these messages, the top window, which may be running on the tracking system 140, may relay the information to a database run or managed by the tracking system 140. Users, businesses, content providers, site owners, and others may access and use this information on "conversions" or other user information to study diffusion and adoption. Other examples are possible.

The tracking system 140 and/or data store 145 may exist on one machine or may be running in a distributed configuration on one or more machines. The tracking system may be or include an application programming interface ("API") which may be used to perform the content address shortening and/or to fetch or track diffusion data. The tracking system 140 may be configured and/or operable to handle billions of redirects (instances where a user has been directed to the tracking system 140 via the shortened content address), and/or be configured and/or operable to shorten billions of content addresses. The tracking system 140 and/or data store 145 may be or include one or more of several configurations of database servers, tracking servers, application servers, mobile application servers, and middleware applications included in the tracking system 140 and/or data store 145. The data store 145 may or may not be part of the tracking system 140, and may or may not be a database server, such as MICROSOFT SQL SERVER®, ORACLE®, IBM DB2®, SQLITE®, or any other database software, relational or otherwise.

The tracking system 140 may be automated or may be controlled manually. The tracking system 140 may in some systems be controlled by a content provider, an online provider, and/or a digital content or media provider. Various other configurations are possible.

The tracking system 140 and/or data store 145 may be or include one or more computing devices and/or servers, such as the computer system 1300 described later. A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

A client device may vary in terms of capabilities or features. Claimed subject matter is intended to cover a wide range of potential variations. For example, a cell phone may include a numeric keypad or a display of limited functionality, such as a monochrome liquid crystal display (LCD) for displaying text. In contrast, however, as another example, a web-enabled client device may include one or more physical or virtual keyboards, mass storage, one or more accelerometers, one or more gyroscopes, global positioning system (GPS) or other location-identifying type capability, or a display with a high degree of functionality, such as a touch-sensitive color 2D or 3D display, for example.

A client device may include or may execute a variety of operating systems, including a personal computer operating system, such as a Windows, iOS or Linux, or a mobile operating system, such as iOS, Android, or Windows Mobile, or the like. A client device may include or may execute a variety of possible applications, such as a client software application enabling communication with other devices, such as communicating one or more messages, such as via email, short message service (SMS), or multimedia message service (MMS), including via a network, such as a social network, including, for example, Facebook, LinkedIn, Twitter, Flickr, or Google+, to provide only a few possible examples. A client device may also include or execute an application to communicate content, such as, for example, textual content, multimedia content, or the like. A client device may also include or execute an application to perform a variety of possible tasks, such as browsing, searching, playing various forms of content, including locally stored or streamed video, or games (such as fantasy sports leagues). The foregoing is provided to illustrate that claimed subject matter is intended to include a wide range of possible features or capabilities.

The tracking system 140, data store 145, and/or client applications 125A-125N or other user devices may each be or include one or more computing devices of various kinds, such as the computing device described below in conjunction with FIG. 13. Such computing devices may generally include any device that may be configured to perform computation and that may be capable of sending and receiving data communications by way of one or more wired and/or wireless communication interfaces. Such devices may be configured to communicate in accordance with any of a variety of network protocols, including but not limited to protocols within the Transmission Control Protocol/Internet Protocol (TCP/IP) protocol suite. For example, the web application 125A may employ the Hypertext Transfer Protocol ("HTTP") to request information, such as a web page, from a web server, which may be a process executing on the tracking system 140.

The computer system 1300, which may be used by or with the tracking system 140, may include a set of instructions that can be executed to cause the computer system 1300 to perform any one or more of the methods or computer based functions disclosed herein. The computer system 1300 may operate as a standalone device or may be connected, e.g., using a network, to other computer systems or peripheral devices.

In a networked deployment, the computer system 1300 may operate in the capacity of a server or as a client user computer in a server-client user network environment, or as a peer computer system in a peer-to-peer (or distributed) network environment. The computer system 1300 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 1300 can be implemented using electronic devices that provide voice, video or data communication. Further, while a single computer system 1300 is illustrated, the term "system" shall also be taken to include any collection of systems or sub-systems that individually or jointly execute a set, or multiple sets, of instructions to perform one or more computer functions.

Figure 13:
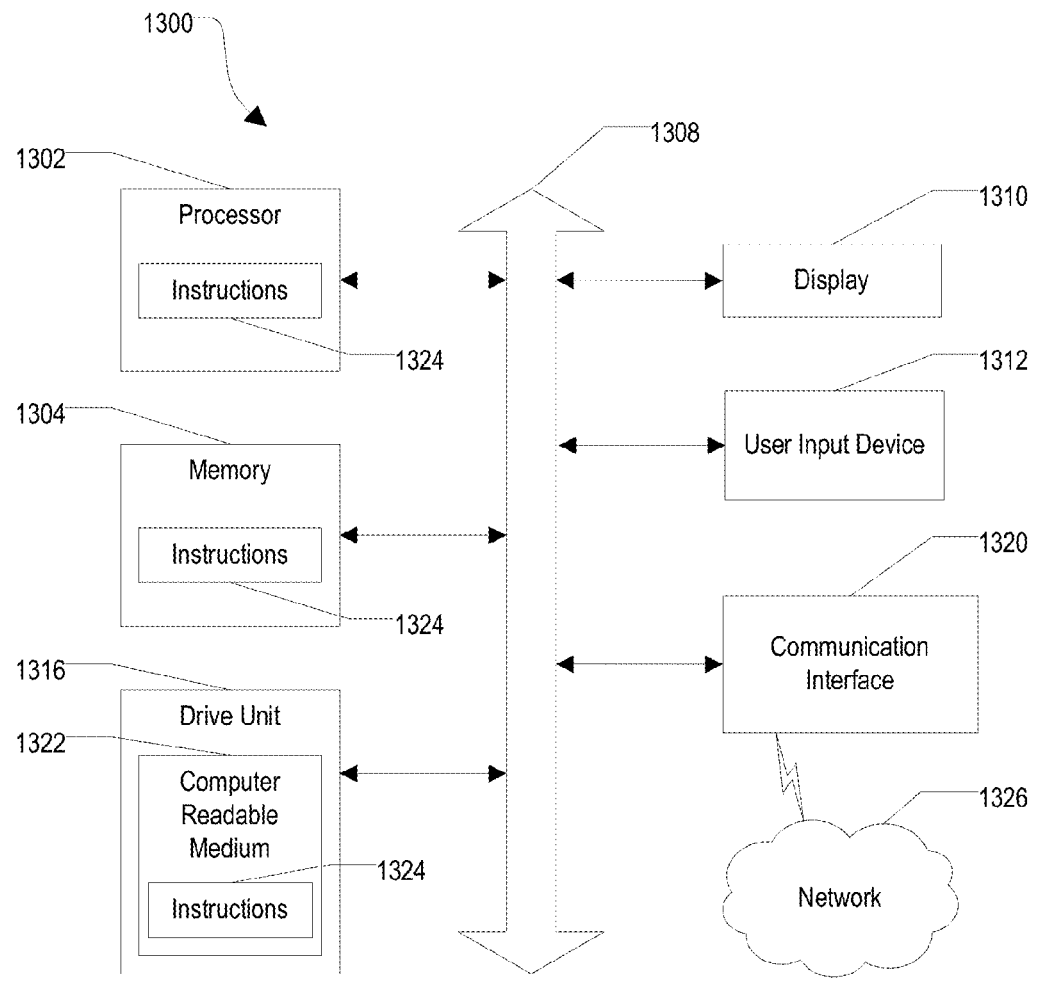
FIG. 13 is an exemplary processing system for use with the tracking systems and methods.

As illustrated in FIG. 13, the computer system 1300 may include a processor 1302, e.g., a central processing unit (CPU), a graphics processing unit (GPU), or both. The processor 1302 may be a component in a variety of systems. For example, the processor 1302 may be part of a standard personal computer or a workstation. The processor 1302 may be one or more general processors, digital signal processors, application specific integrated circuits, field programmable gate arrays, servers, networks, digital circuits, analog circuits, combinations thereof, or other now known or later developed devices for analyzing and processing data. The processor 1302 may implement a software program, such as code generated manually (i.e., programmed).

The computer system 1300 may include a memory 1304 that can communicate via a bus 1308. The memory 1304 may be a main memory, a static memory, or a dynamic memory.

The memory 1304 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one embodiment, the memory 1304 includes a cache or random access memory for the processor 1302. In alternative embodiments, the memory 1304 is separate from the processor 1302, such as a cache memory of a processor, the system memory, or other memory. The memory 1304 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 1304 is operable to store instructions executable by the processor 1302. The functions, acts or tasks illustrated in the figures or described herein may be performed by the programmed processor 1302 executing the instructions stored in the memory 1304. The functions, acts or tasks are independent of the particular type of instructions set, storage media, processor or processing strategy and may be performed by software, hardware, integrated circuits, firmware, micro-code and the like, operating alone or in combination. Likewise, processing strategies may include multi-processing, multitasking, parallel processing and the like.

As shown, the computer system 1300 may further include a display unit 1310, such as a liquid crystal display (LCD), an organic light emitting diode (OLED), a flat panel display, a solid state display, a cathode ray tube (CRT), a projector, a printer or other now known or later developed display device for outputting determined information. The display 1310 may act as an interface for the user to see the functioning of the processor 1302, or specifically as an interface with the software stored in the memory 1304 or in the drive unit 1316.

Additionally or alternatively, the computer system 1300 may include an input device 1312 configured to allow a user to interact with any of the components of system 1300. The input device 1312 may be a number pad, a keyboard, or a cursor control device, such as a mouse, or a joystick, touch screen display, remote control or any other device operative to interact with the computer system 1300.

The computer system 1300 may also include a disk or optical drive unit 1316. The disk drive unit 1316 may include a computer-readable medium 1322 in which one or more sets of instructions 1324, e.g. software, can be embedded. Further, the instructions 1324 may embody one or more of the methods or logic as described herein. In a particular embodiment, the instructions 1324 may reside completely, or at least partially, within the memory 1304 and/or within the processor 1302 during execution by the computer system 1300. The memory 1304 and the processor 1302 also may include computer-readable media as discussed above.

The computer-readable medium may includes instructions 1324 or receive and execute instructions 1324 responsive to a propagated signal so that a device connected to a network 1326 can communicate voice, video, audio, images or any other data over the network 1326. Further, the instructions 1324 may be transmitted or received over the network 1326 via a communication port or interface 1320, and/or using a bus 1308. The communication port or interface 1320 may be a part of the processor 1302 or may be a separate component. The communication port 1320 may be created in software or may be a physical connection in hardware. The communication port 1320 may be configured to connect with a network 1326, external media, the display 1310, or any other components in system 1300, or combinations thereof. The connection with the network 1326 may be a physical connection, such as a wired Ethernet connection or may be established wirelessly as discussed below. Likewise, the additional connections with other components of the system 1300 may be physical connections or may be established wirelessly. The network 1326 may alternatively be directly connected to the bus 1308.

While the computer-readable medium may be described as a single medium, the term "computer-readable medium" may include a single medium or multiple media, such as a centralized or distributed database, and/or associated caches and servers that store one or more sets of instructions. The term "computer-readable medium" may also include any medium that is capable of storing, encoding or carrying a set of instructions for execution by a processor or that cause a computer system to perform any one or more of the methods or operations disclosed herein. The "computer-readable medium" may be non-transitory, and may be tangible.

In one example, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative example, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

The network 1326 may be the same, included in, overlap, or similar to network 110. The network 1326 may couple devices so that communications may be exchanged, such as between a server and a client device or other types of devices, including between wireless devices coupled via a wireless network, for example. The network 1326 may also include mass storage, such as network attached storage (NAS), a storage area network (SAN), or other forms of computer or machine readable media, for example. The network 1326 may include the Internet, one or more local area networks (LANs), one or more wide area networks (WANs), wire-line type connections, wireless type connections, or any combination thereof. Likewise, sub-networks, such as may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs.

A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a telephone line or link, for example.

The network 1326 may be wired or wireless networks. A wireless network may couple client devices with a network. A wireless network may employ standalone ad-hoc networks, mesh networks, Wireless LAN (WLAN) networks, cellular networks, an 802.11, 802.16, 802.20, or WiMax network. Further, the network 1326 may be a public network, such as the Internet, a private network, such as an intranet, or combinations thereof, and may utilize a variety of networking protocols now available or later developed including, but not limited to TCP/IP based networking protocols.

A wireless network may further include a system of terminals, gateways, routers, or the like coupled by wireless radio links, or the like, which may move freely, randomly or organize themselves arbitrarily, such that network topology may change, at times even rapidly. A wireless network may further employ a plurality of network access technologies, including Long Term Evolution (LTE), WLAN, Wireless Router (WR) mesh, or 2nd, 3rd, or 4th generation (2G, 3G, or 4G) cellular technology, or the like. Network access technologies may enable wide area coverage for devices, such as client devices with varying degrees of mobility, for example.

For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or the like. A wireless network may include virtually any type of wireless communication mechanism by which signals may be communicated between devices, such as a client device or a computing device, between or within a network, or the like.

Signal packets communicated via the networks 110 and 1326, such as a network of participating digital communication networks, may be compatible with or compliant with one or more protocols. Signaling formats or protocols employed may include, for example, TCP/IP, UDP, DECnet, NetBEUI, IPX, Appletalk, or the like. Versions of the Internet Protocol (IP) may include IPv4 or IPv6.

The Internet refers to a decentralized global network of networks. The Internet includes local area networks (LANs), wide area networks (WANs), wireless networks, or long haul public networks that, for example, allow signal packets to be communicated between LANs. Signal packets may be communicated between nodes of a network, such as, for example, to one or more sites employing a local network address. A signal packet may, for example, be communicated over the Internet from a user site via an access node coupled to the Internet. Likewise, a signal packet may be forwarded via network nodes to a target site coupled to the network via a network access node, for example. A signal packet communicated via the Internet may, for example, be routed via a path of gateways, servers, etc. that may route the signal packet in accordance with a target address and availability of a network path to the target address.

The network 1326 may be or include a content distribution network. A "content delivery network" or "content distribution network" (CDN) generally refers to a distributed content delivery system that comprises a collection of computers or computing devices linked by a network or networks. A CDN may employ software, systems, protocols or techniques to facilitate various services, such as storage, caching, communication of content, or streaming media or applications. Services may also make use of ancillary technologies including, but not limited to, "cloud computing," distributed storage, DNS request handling, provisioning, signal monitoring and reporting, content targeting, personalization, or business intelligence. A CDN may also enable an entity to operate or manage another's site infrastructure, in whole or in part.

The network 1326 may be or include a peer-to-peer network. A peer-to-peer (or P2P) network may employ computing power or bandwidth of network participants in contrast with a network that may employ dedicated devices, such as dedicated servers, for example; however, some networks may employ both as well as other approaches. A P2P network may typically be used for coupling nodes via an ad hoc arrangement or configuration. A peer-to-peer network may employ some nodes capable of operating as both a "client" and a "server."

The network 1326 may be or include a social network. The term "social network" refers generally to a network of individuals, such as acquaintances, friends, family, colleagues, or co-workers, coupled via a communications network or via a variety of sub-networks. Potentially, additional relationships may subsequently be formed as a result of social interaction via the communications network or sub-networks. A social network may be employed, for example, to identify additional connections for a variety of activities, including, but not limited to, dating, job networking, receiving or providing service referrals, content sharing, creating new associations, maintaining existing associations, identifying potential activity partners, performing or supporting commercial transactions, or the like.

A social network may include individuals with similar experiences, opinions, education levels or backgrounds. Subgroups may exist or be created according to user profiles of individuals, for example, in which a subgroup member may belong to multiple subgroups. An individual may also have multiple "1:few" associations within a social network, such as for family, college classmates, or co-workers.

An individual's social network may refer to a set of direct personal relationships or a set of indirect personal relationships. A direct personal relationship refers to a relationship for an individual in which communications may be individual to individual, such as with family members, friends, colleagues, co-workers, or the like. An indirect personal relationship refers to a relationship that may be available to an individual with another individual although no form of individual to individual communication may have taken place, such as a friend of a friend, or the like. Different privileges or permissions may be associated with relationships in a social network. A social network also may generate relationships or connections with entities other than a person, such as companies, brands, or so-called 'virtual persons.' An individual's social network may be represented in a variety of forms, such as visually, electronically or functionally. For example, a "social graph" or "socio-gram" may represent an entity in a social network as a node and a relationship as an edge or a link.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The network environment 100 and/or tracking system 140 may be configured or operable for multi-modal communication which may occur between members of a social network. Individuals within one or more social networks may interact or communication with other members of a social network via a variety of devices. Multi-modal communication technologies refers to a set of technologies that permit interoperable communication across multiple devices or platforms, such as cell phones, smart phones, tablet computing devices, personal computers, televisions, SMS/MMS, email, instant messenger clients, forums, social networking sites (such as Facebook, Twitter, or Google+), or the like.

The tracking system 140 may offer many benefits and advantages. The tracking system 140 may allow a user to shorten a content address and/or track diffusion or sharing of the content through one or many users. The tracking system 140 may, for example, allow users to visualize and view how information or data posted or sent by one user may spread or diffuse to other users. The tracking system 140 may allow a user, content provider, web site, or other business or user to track diffusion from person to person, regardless of how one or more users decided to share content. This may provide advantages over specifically designed widgets created to track how content is spread, in that the tracking system 140 may track the spread of content in any manner, without requiring a user to log in, use a widget, or pass content in one or a few defined manners. The tracking system 140 may also or alternatively give site owners and users the ability to detect which pieces of content are spreading from peer to peer across the internet. Various other advantages are possible.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The above disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

While various embodiments of the invention have been described, it will be apparent to those of ordinary skill in the art that many more embodiments and implementations are possible within the scope of the invention. Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part. Accordingly, the invention is not to be restricted except in light of the attached claims and their equivalents.

We claim:

1. A computer-implemented method of tracking diffusion, comprising:
    receiving a tracking request from an initiating user to track diffusion of content located at a content address;
    generating, with a computer tracking system, a first shortened content address for the content address, the first shortened content address configured to direct content requests made using the first shortened content address to the computer tracking system;
    providing the content to the initiating user using the first shortened content address;
    receiving content requests from one or more requesting users;
    generating, for each requesting user, a subsequent shortened content address for the content address, the subsequent shortened content address being different for each requesting user; and
    providing the content to each requesting user using the subsequent shortened content address generated for each requesting user respectively;
    where the content requests from one or more requesting users are made using the first shortened content address or one of the subsequent shortened content addresses.

2. The method of claim 1, further comprising:
    creating and storing a first entry in a database for the initiating user, the first entry including a first link identifier for first shortened content address, and a content address identifier for the content address associated with the tracking request; and
    creating and storing a subsequent entry in the database for each requesting user, each subsequent entry including a subsequent link identifier for the subsequent shortened content address generated for each requesting user, the content address identifier, and a parent link identifier for the shortened content address associated with the content request from the requesting user.

3. The method of claim 2, further comprising generating a model visually illustrating associations between the first entry and subsequent entries in the database.

4. The method of claim 1, where the first shortened content address comprises a shortened content address base and a first link identifier.

5. The method of claim 4, where the shortened content address base is configured to direct content requests from one or more requesting users to the tracking system.

6. The method of claim 4, where each subsequent shortened content address comprises the shortened content address base and a unique subsequent link identifier.

* * * * *